United States Patent
Lee et al.

(10) Patent No.: US 7,885,627 B2
(45) Date of Patent: Feb. 8, 2011

(54) OPTIMAL INITIAL GAIN SELECTION FOR WIRELESS RECEIVER

(75) Inventors: Christine Lee, Mountain View, CA (US); Chien-Meen Hwang, San Jose, CA (US); Yong Li, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 949 days.

(21) Appl. No.: 10/612,954

(22) Filed: Jul. 7, 2003

(65) Prior Publication Data

US 2005/0009488 A1    Jan. 13, 2005

(51) Int. Cl.
    *H04B 1/06*        (2006.01)
(52) U.S. Cl. .............. 455/241.1; 455/232.1; 455/234.1
(58) Field of Classification Search .............. 455/234.1, 455/234.2, 245.1, 232.1–253.2
See application file for complete search history.

(56) References Cited

U.S. PATENT DOCUMENTS

| | | | |
|---|---|---|---|
| 5,732,341 A * | 3/1998 | Wheatley, III | 455/234.1 |
| 5,838,269 A | 11/1998 | Xie | |
| 5,917,865 A | 6/1999 | Kopmeiners et al. | |
| 6,018,650 A * | 1/2000 | Petsko et al. | 455/234.1 |
| 6,442,380 B1 | 8/2002 | Mohindra | |
| 6,532,391 B1 | 3/2003 | Nayler | |
| 7,206,420 B2 * | 4/2007 | Bizjak | 381/106 |
| 2003/0035549 A1 * | 2/2003 | Bizjak et al. | 381/56 |
| 2003/0083030 A1 * | 5/2003 | Scheffler | 455/245.1 |

FOREIGN PATENT DOCUMENTS

| | | |
|---|---|---|
| CA | 2 360 266 | 4/2002 |
| CN | 1364337 A | 8/2002 |

OTHER PUBLICATIONS

Eberle et al., "OFDM-WLAN Receiver Performance Improvement using Digital Compensation Techniques", Proceedings IEEE RAWCON 2002, Aug. 11, 2002, pp. 111-114, Piscataway, US.
IEEE Std. 802.11a-1999, "Part 11: Wireless LAN Medium Access Control (MAC) and Physical Layer (PHY) specifications: High-speed Physical Layer in the 5 GHZ Band", L.AN/MAN Standards Committee of the IEEE Computer Society, IEEE-SA Standards Board, Approved Sep. 16, 1999, New York, USA.

* cited by examiner

*Primary Examiner*—Lana N Le
(74) *Attorney, Agent, or Firm*—Manelli Denison & Selter PLLC; Leon R. Turkevich

(57) ABSTRACT

An OFDM wireless transceiver uses a digital automatic gain control (AGC) module. The digital AGC module is configured for setting a gain to an initial gain value for mapping a received wireless signal to a first power value for an input circuit having a prescribed input range. The initial gain value is set relative to the prescribed input range and a prescribed signal to noise ratio. If the digital AGC module determines that the first power value of the received wireless signal does not exceed the prescribed input range, the digital AGC module calculates an optimum gain for the received wireless signal relative to the initial gain value and the first power value; if the first power value exceeds the prescribed input range, the AGC module determines the optimum gain based on setting the gain to a minimum gain value.

7 Claims, 3 Drawing Sheets

OPTIMAL INITIAL GAIN SELECTION FOR WIRELESS RECEIVER

BACKGROUND OF THE INVENTION

1. Field of the Invention

The present invention relates to an automatic gain controller (AGC) module of a wireless receiver, for example an IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11 based OFDM PHY in hardware involves providing a cost-effective, compact device the can be implemented in smaller wireless devices. Hence, implementation concerns typically involve cost, device size, and device complexity.

In particular, Automatic Gain Control (AGC) algorithms are used to ensure that a received wireless signal is amplified to the match the dynamic range of the analog-to-digital (A/D) converter of the receiver. Communications systems typically use analog AGC modules to control the received wireless signal detected by the receiver antenna. In particular, the AGC would control an analog amplifier and determine the peak signal levels of the amplified signal relative to the input range of the A/D converter; if the if the peak of the amplified signal exceeds the input range of the A/D converter, the AGC module reduces the gain of the analog amplifier using a control feedback system. However, substantial delays are introduced by the time necessary to measure the signal, and adjust the gain relative to the feedback system. These problems are substantial in the case of a digital wireless signal transmitted according to IEEE 802.11a, since the received signal may have a range of about from −90 dBm to −30 dBm. Hence, difficulties arise in providing a stable, feedback control system for an analog AGC module.

SUMMARY OF THE INVENTION

There is a need for an arrangement that enables a wireless transceiver to amplify a received wireless signal by adjusting an amplifier to an optimized gain with minimal delay, resulting in minimal loss of data from the received wireless signal.

These and other needs are attained by the present invention, where an OFDM wireless transceiver uses a digital automatic gain control (AGC) module. The digital AGC module is configured for setting a gain to an initial gain value for mapping a received wireless signal to a first power value for an analog to digital (A/D) converter having a prescribed input range. The initial gain value is set relative to the prescribed input range and a prescribed signal to noise ratio. If the digital AGC module determines that the first power value of the received wireless signal does not exceed the prescribed input range, the digital AGC module calculates an optimum gain for the received wireless signal relative to the initial gain value and the first power value; if the first power value exceeds the prescribed input range, the AGC module determines the optimum gain based on setting the gain to a minimum gain value. Hence, the AGC module can provide rapid convergence to an optimal gain for amplifying the received wireless signal for the A/D converter, providing the OFDM wireless transceiver additional time for synchronization with the received wireless signal.

One aspect of the present invention provides a method in a wireless transceiver. The method includes setting a gain to an initial gain value for mapping a received wireless signal to a first power value for supply of the received wireless signal to an input circuit having a prescribed input range. The method also includes amplifying the received wireless signal by the initial gain value to the first power value. If the first power value of the received wireless signal does not exceed the prescribed input range, an optimum gain for the received wireless signal is determined relative to the initial gain value and the first power value. If the first power value of the received wireless signal exceeds the prescribed input range, the optimum gain for the received wireless signal is determined based on setting the gain to a minimum gain value. The received wireless signal is thus output at the optimum gain.

Another aspect of the present invention provides a wireless transceiver. The wireless transceiver includes an input circuit having a prescribed input range, and a digital gain controller. The digital gain controller is configured for amplifying a received wireless signal to an optimum gain value for the prescribed input range by: (1) setting a gain to an initial gain value for mapping the received wireless signal to a first power value for supply of the received wireless signal to the input circuit; (2) amplifying the received wireless signal by the initial gain value to the first power value; (3) if the first power value of the received wireless signal does not exceed the prescribed input range, determining an optimum gain for the received wireless signal relative to the initial gain value and the first power value; and (4) if the first power value of the received wireless signal exceeds the prescribed input range, determining the optimum gain for the received wireless signal based on setting the gain to a minimum gain value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11 OFDM transceiver, followed by a detailed description of the digital automatic gain control (AGC) module implemented according to an embodiment of the present invention.

Receiver Architecture Overview

Figure 1:
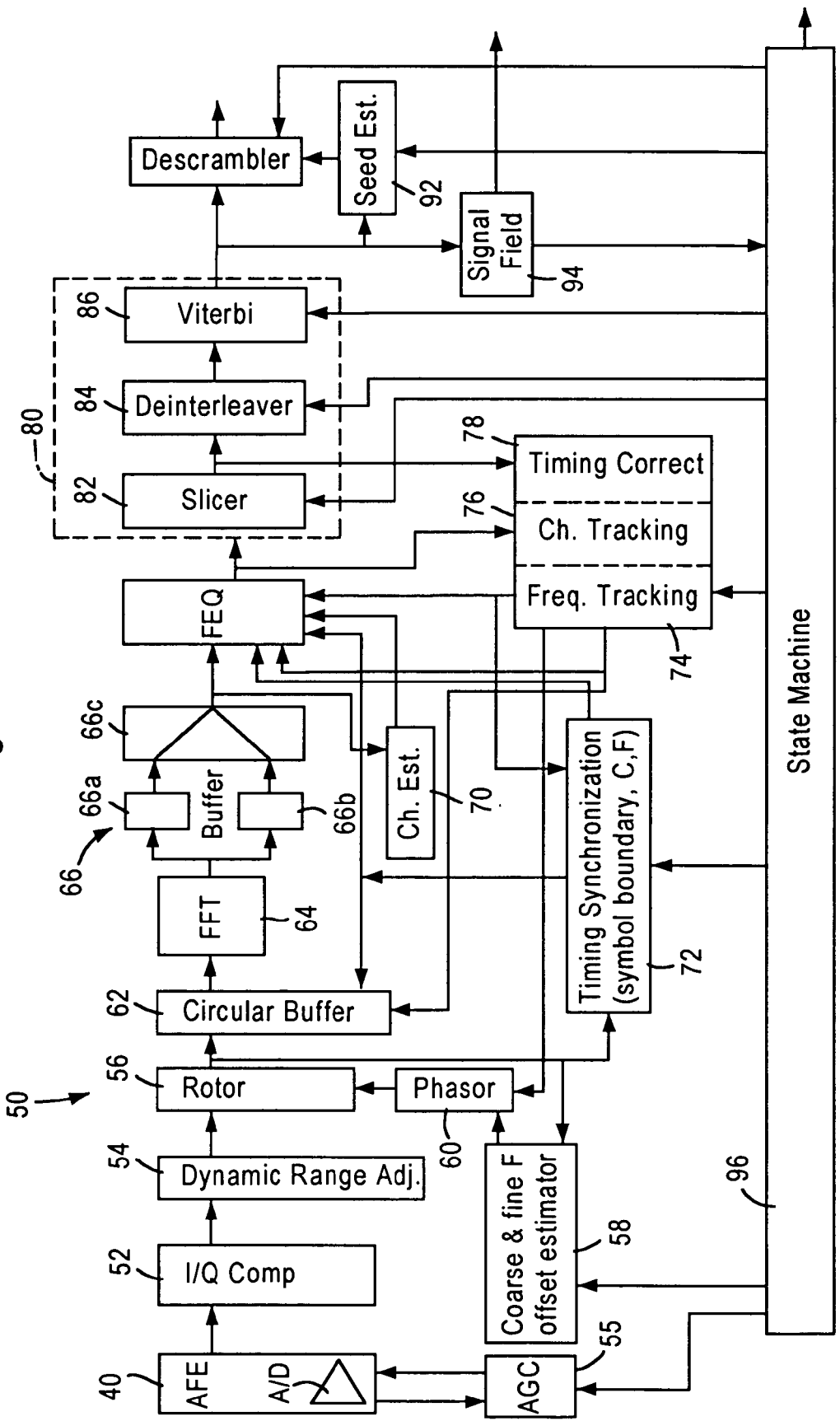
FIG. 1 is a diagram illustrating a receiver module of an IEEE 802.11 OFDM transceiver implemented according to an embodiment of the present invention.

FIG. 1 is a diagram illustrating an architecture of a receiver module 50 of an IEEE 802.11 Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11 preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11 specification.

The descrambler circuit 90 is configured for recovering the original serial bit stream from the decoded data, by descrambling a 127-bit sequence generated by the scrambler of the transmitter, according to the IEEE 802.11 specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11 compliant Media Access Controller (MAC).

Optimal Initial Gain Selection

Figure 2:
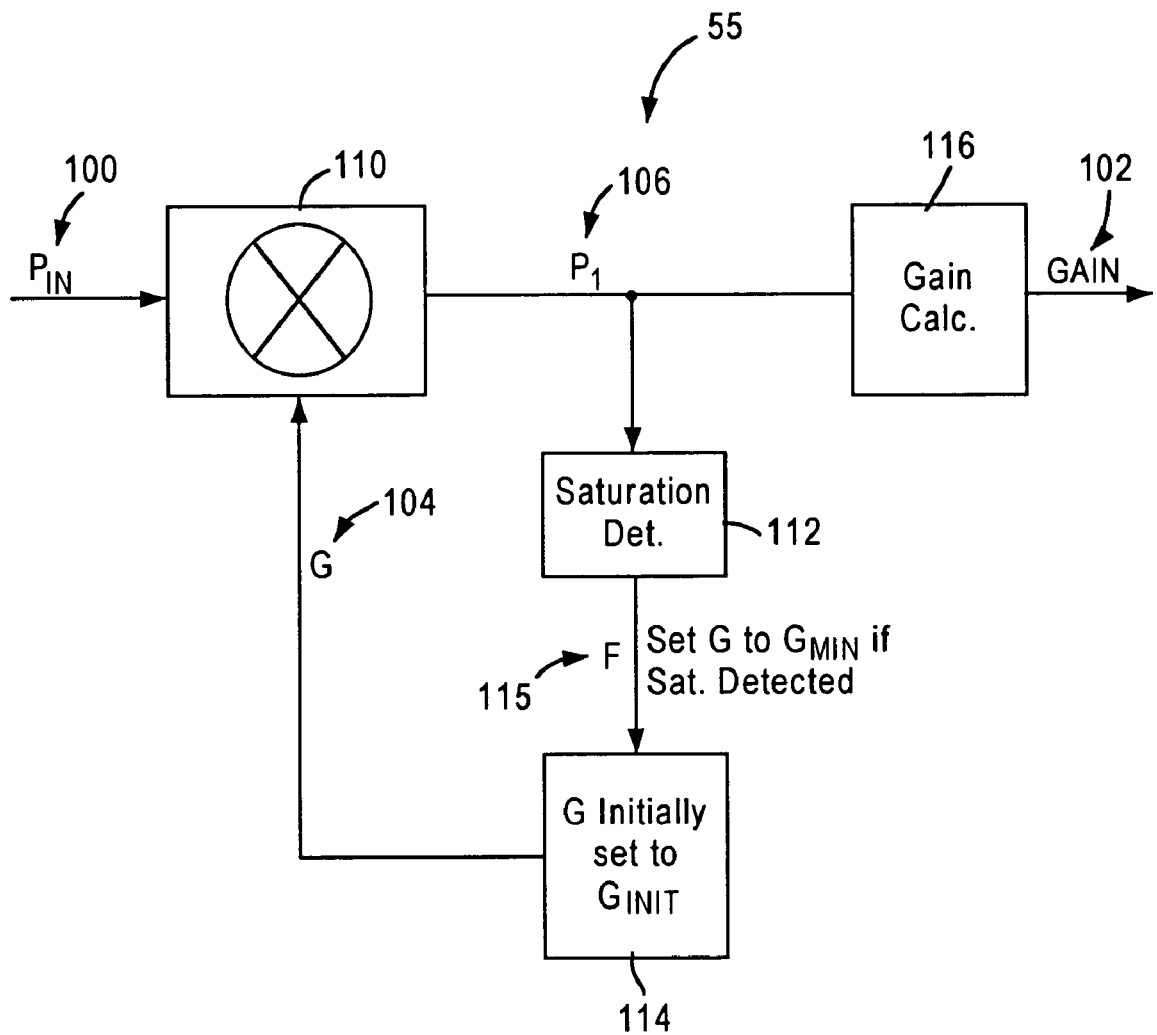
FIG. 2 is a diagram illustrating the digital automatic gain control (AGC) module of FIG. 1, according to an embodiment of the present invention.

FIG. 2 is a diagram illustrating operations of the digital AGC module 55 of FIG. 1, according to an embodiment of the present invention. The digital AGC module 55 is configured for controlling amplifying the received wireless signal ($P_{IN}$) 100 by an optimum gain (GAIN) 102 to optimize the prescribed input range of an input circuit, for example the A/D converter in the AFE 40.

As described above, a problem encountered in prior AGC systems is that a relatively long time was needed for the analog-based AGC algorithm to converge to an optimal value, limiting the time available for a receiver to synchronize on the received wireless signal.

According to the disclosed embodiment, an initial gain 104 is calculated (G=$G_{INIT}$) for a given dynamic range such that the received wireless signal sample 100 will map to a first power value ($P_1$) 106; the first power value 106 is used to determine whether the initial gain 104 maps the received wireless signal ($P_{IN}$) 100 within a prescribed dynamic range (i.e., input range) of an input circuit, for example an A/D converter. The digital AGC module (i.e., digital gain controller) 55 includes a amplifier 110, the saturation detector 112, an initial gain selector 114, and a gain calculator 116.

According to the disclosed embodiment, the initial gain selector 114 is configured for initially setting the gain value (G=$G_{INIT}$) such that a received wireless signal ($P_{IN}$) 100 having a relatively small input level will be amplified to a sufficient power level matching the input range of the input circuit (e.g., A/D converter). For example, a received wireless signal ($P_{IN}$) 100 may have a substantially large input signal range, on the order of −90 dBm to −30 dBm (note: 0 dBm is defined as one milliwatt (1 mW) of power into a terminating node), and an A/D converter may be configured as a 10-bit A/D having an input range of 1V (equivalent to 13 dBm at 50 Ohms), with a quantization noise floor of 1/512 (2 mV). In addition, assume the analog front end (AFE) amplifier 40 of FIG. 1 provides an analog gain ($G_{ANALOG}$) that can be set at a maximum gain of 35 dB, resulting in 95 dB total maximum gain.

Hence, the initial gain selector 114 sets the gain (G) to an initial gain value (G=$G_{INIT}$) to enable a received wireless signal ($P_{IN}$) 100, having a relatively minimum input level, to be amplified to be detectable over the quantization noise level of the input circuit (e.g., the A/D converter), and preferably four times (4×) the quantization noise level. The internal calculator 116 calculates the optimum gain (GAIN) 102 for the received wireless signal 100 once the received wireless signal is mapped to the first power value 106 within the input range of the input circuit, enabling the optimum gain value 102 to be determined within two steps, namely within about two execution cycles of the state machine 96.

If the saturation detector 112 detects that the first power value 106 exceeds the prescribed input range for the input circuit, indicating the received wireless signal 100 has a high input level, the initial gain selector 114 resets the gain 104 to a minimum gain value (e.g., by setting and outputting a flag (F) 115 to the initial gain selector 114), enabling the internal calculator 116 to determine the optimum gain 102 based on the initial gain selector 114 setting the gain to a minimum gain value ($G_{MIN}$). In other words, the internal calculator 116 determines the optimum gain 102 based on whether the received wireless signal 100 has a low input level or a high input level based on the absence or presence of saturation detected by the saturation detector 112, respectively. Consequently, the internal calculator 116 is able to initiate computations based on determining that the detected saturation corresponds to a signal having a high input level, enabling the automatic gain controller to obtain the desired gain 102 within two steps, namely within about two execution cycles of the state machine.

Figure 3:
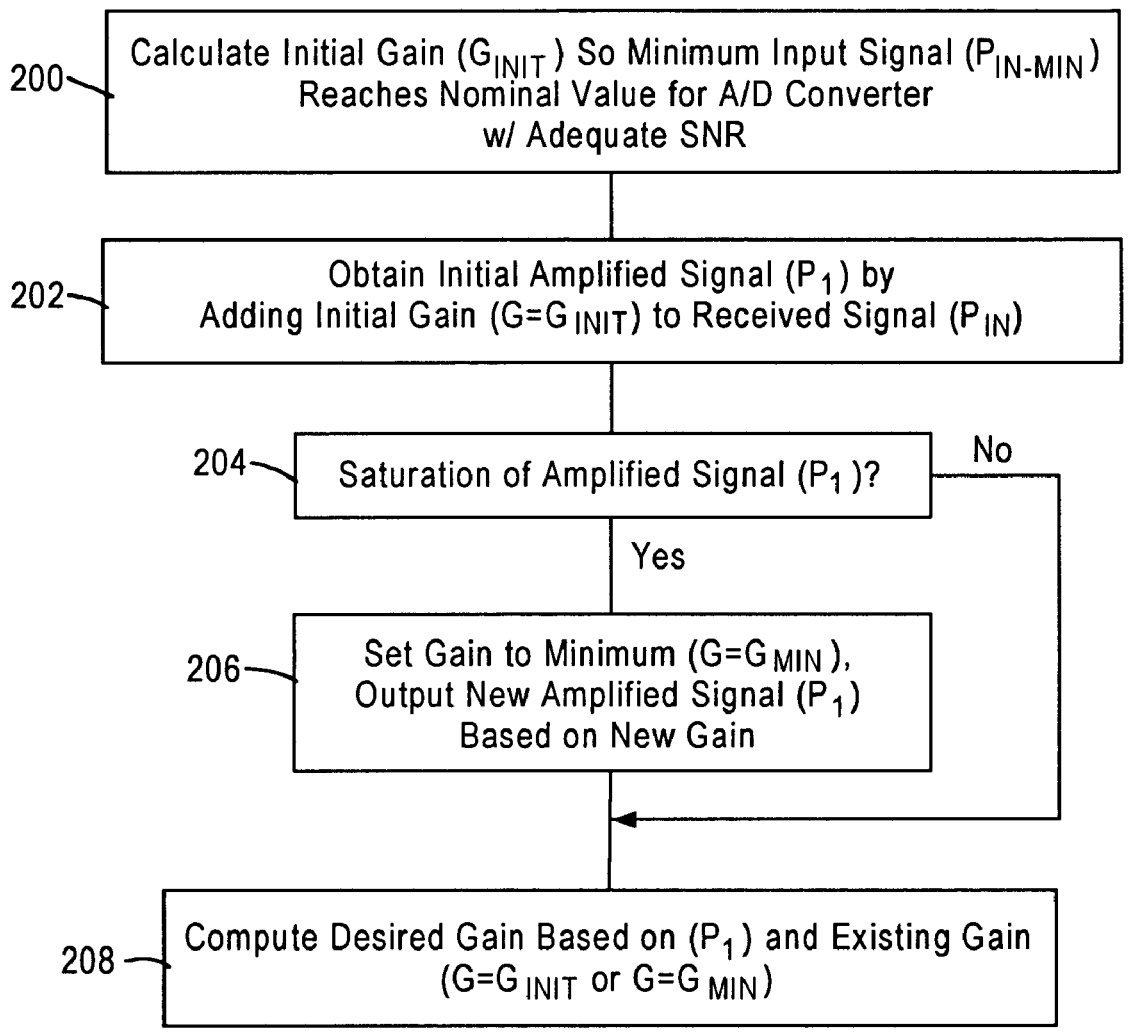
FIG. 3 is a diagram illustrating the method by the AGC module of calculating an optimum gain for a received wireless signal, according to an embodiment of the present invention.

FIG. 3 is a diagram illustrating the method of performing optimal initial gain selection, according to an embodiment of the present invention. The initial gain selector 114 calculates in step 200 the initial gain such that the expected minimum signal level ($P_{IN-MIN}$) for the input signal is detectable over the quantization noise level of the A/D converter with an adequate signal to noise ratio. The initial gain also is based on the maximum analog gain ($G_{ANALOG}$) generated by the analog front end combined with the maximum value of the gain 102.

Once the initial gain has been set, the amplifier 110 amplifies in step 202 the received signal ($P_{IN}$) 100 by adding the initial gain (G=$G_{INIT}$) to obtain the first power value ($P_1$) 106. If in step 204 the saturation detector 112 detects saturation of the amplified signal 106, the initial gain selector 114 resets in step 206 the gain 104 to the minimum gain value (G=$G_{MIN}$), causing the amplifier 110 to output in step 206 the new amplified signal 106 based on the minimum gain. The desired gain 102 is then computed in step 210 by the internal calculator 116, enabling the input signal 100 to be output at the optimum gain for matching the input range of the input circuit.

If in step 204 no saturation is detected by the saturation detector 112, the gain calculator 116 calculates in step 208 the desired gain based on the amplified signal 106, amplified by the existing initial gain (G=$G_{INIT}$), falling within the input range of the input circuit.

Hence, gain selection can be implemented more quickly, and more accurately using the disclosed gain selection.

AGC Algorithm Using Binary Search for Wireless LAN Application

A variation of the above-described embodiment involves setting a new gain by the initial gain controller 114 to half the initial maximum Gain value. In particular, use of a trial and error method to determine the correct gain, as performed by existing AGC algorithms, may cause a potential oscillation and a long convergence time.

To solve this problem, the initial gain can be set to the maximum gain value. The average signal is measured after having been amplified by the maximum gain: if saturation is detected, the new gain is set to one half the prior gain (in this first instance one half the maximum gain). The process is repeated until the signal level is substantially equal to, or close to, the desired level.

AGC Algorithm by the Weight of Sigmoid Function

Another variation in adjusting gain involves adjusting the slope of a sigmoid function. In particular, the gain is multiplied by a weight value: if saturation occurs, the weight is adjusted to less than one; if the output signal value is too small, the weight is adjusted to be greater than one.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a wireless transceiver, the method including:
    setting a gain to an initial gain value for mapping a received wireless signal to a first power value for supply of the received wireless signal to an input circuit having a prescribed input range;
    amplifying the received wireless signal by the initial gain value to the first power value;
    if the first power value of the received wireless signal does not exceed the prescribed input range, determining an optimum gain for the received wireless signal relative to the initial gain value and the first power value;
    if the first power value of the received wireless signal exceeds the prescribed input range, determining the optimum gain for the received wireless signal based on setting the gain to a minimum gain value; and
    outputting the received wireless signal at the optimum gain.

2. The method of claim 1, wherein the setting step includes:
    setting the initial gain value based on a dynamic range of the wireless transceiver and based on a prescribed signal to noise ratio.

3. The method of claim 2, wherein the dynamic range includes a maximum analog gain supplied by an analog front end amplifier, and a maximum range for the gain.

4. A wireless transceiver including:
    input circuit having a prescribed input range; and
    a digital gain controller configured for amplifying a received wireless signal to an optimum gain value for the prescribed input range by:
    (1) setting a gain to an initial gain value for mapping the received wireless signal to a first power value for supply of the received wireless signal to the input circuit,
    (2) amplifying the received wireless signal by the initial gain value to the first power value,
    (3) if the first power value of the received wireless signal does not exceed the prescribed input range, determining an optimum gain for the received wireless signal relative to the initial gain value and the first power value, and
    (4) if the first power value of the received wireless signal exceeds the prescribed input range, determining the optimum gain for the received wireless signal based on setting the gain to a minimum gain value.

5. The wireless transceiver of claim 4, wherein the digital gain controller is configured for setting the initial gain value based on a dynamic range of the wireless transceiver and based on a prescribed signal to noise ratio.

6. The wireless transceiver of claim 5, further comprising an analog front end amplifier configured for amplifying the received wireless signal by up to a maximum analog gain and outputting the received wireless signal to the digital gain controller, wherein the dynamic range includes the maximum analog gain and a maximum range for the gain.

7. The wireless transceiver of claim 6, wherein the wireless transceiver is configured as an Orthogonal Frequency Division Multiplexing (OFDM) receiver configured for receiving the received wireless signal according to IEEE 802.11a protocol.

* * * * *